Figure 1:
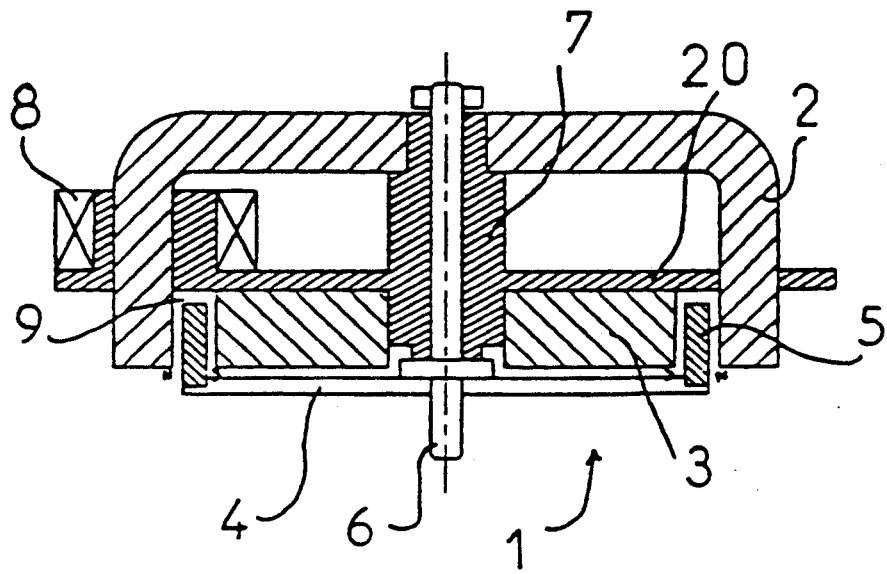

United States Patent [19]
Oudet et al.

[11] Patent Number: 5,298,825
[45] Date of Patent: Mar. 29, 1994

[54] SINGLE PHASE ELECTRO-MAGNETIC ACTUATOR WITH LOW OBSTRUCTION

[75] Inventors: Claude Oudet, Besancon; Daniel Prudham, Thise, both of France

[73] Assignee: Moving Magnet Technologies SA, Besancon, France

[21] Appl. No.: 651,348

[22] PCT Filed: Jun. 15, 1990

[86] PCT No.: PCT/FR90/00436
§ 371 Date: Feb. 19, 1991
§ 102(e) Date: Feb. 19, 1991

[87] PCT Pub. No.: WO90/16107
PCT Pub. Date: Dec. 27, 1990

[30] Foreign Application Priority Data
Jun. 16, 1989 [FR] France .................. 89 08052

[51] Int. Cl.[5] .................. H02K 1/06; H02K 1/27; H02K 21/12
[52] U.S. Cl. .................. 310/156; 310/17; 310/254; 310/266
[58] Field of Search .................. 310/17, 156, 174, 175, 310/254, 261, 264–268

[56] References Cited

U.S. PATENT DOCUMENTS

| | | | |
|---|---|---|---|
| 1,982,826 | 12/1934 | Nein et al. | 310/168 |
| 4,255,682 | 3/1981 | Toida et al. | 310/168 |
| 4,329,601 | 5/1982 | Mai | 310/49 R |
| 4,336,471 | 6/1982 | Plancon | 310/49 R |
| 4,337,449 | 6/1982 | Oudet | 335/225 |
| 4,340,828 | 7/1982 | Sudler et al. | 310/49 R |
| 4,387,312 | 6/1983 | Oudet | 310/49 R |
| 4,518,883 | 5/1985 | Oudet | 310/49 R |
| 4,551,645 | 11/1985 | Takahashi et al. | 310/46 |
| 4,682,067 | 7/1987 | Oudet | 310/156 |
| 4,686,397 | 8/1987 | Lechner | 310/41 |
| 4,713,565 | 12/1987 | Grosjean | 310/49 R |
| 4,714,854 | 12/1987 | Oudet | 310/268 |
| 4,728,833 | 3/1988 | Shiraki et al. | 310/68 R |
| 4,763,050 | 8/1988 | Ruppert | 318/254 |
| 4,782,255 | 11/1988 | Oosaka et al. | 310/68 R |
| 4,823,040 | 4/1989 | Oudet | 310/268 |
| 4,827,171 | 5/1989 | Bertram et al. | 310/162 |
| 4,837,474 | 6/1989 | Petersen et al. | 310/254 |
| 4,839,551 | 6/1989 | Tomisawa | 310/90 |
| 4,985,652 | 1/1991 | Oudet et al. | 310/15 |

FOREIGN PATENT DOCUMENTS

| | | |
|---|---|---|
| 972659 | 3/1955 | Fed. Rep. of Germany . |
| 2254897 | 3/1978 | Fed. Rep. of Germany . |
| 2071121 | 9/1971 | France . |
| 549308 | 5/1974 | Switzerland . |

Primary Examiner—R. Skudy
Assistant Examiner—D. R. Haszko
Attorney, Agent, or Firm—Oblon, Spivak, McClelland, Maier & Neustadt

[57] ABSTRACT

The invention relates to a monophase electromagnetic actuator which includes a rotor (1) with a cylindrical magnetized section (5) divided into two N poles transversely magnetized in alternate directions. The actuator also includes a stator structure consisting of a first magnetic circuit (2) and a second magnetic circuit (3), which are joined only by non-magnetic linking parts. Application: miniature actuators for precision and instrumentation work.

11 Claims, 3 Drawing Sheets

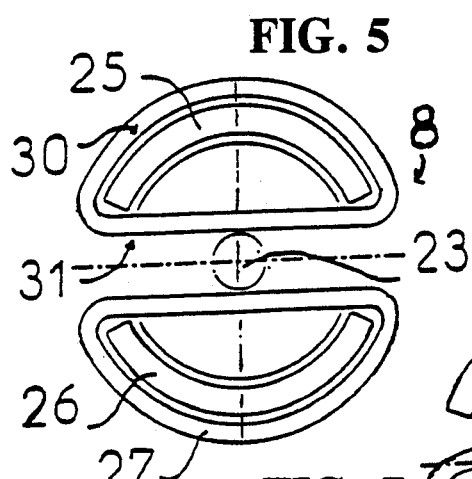
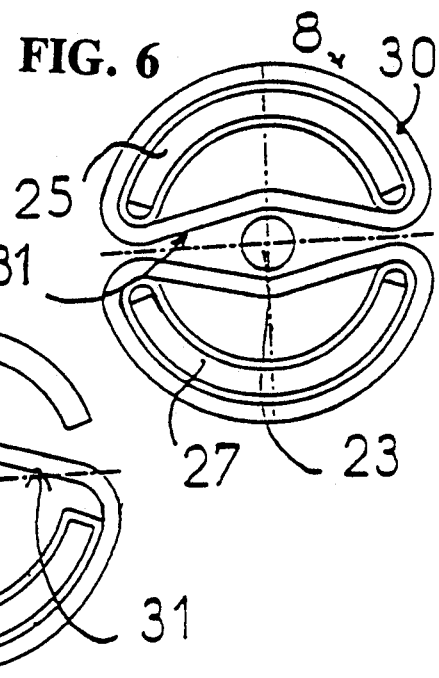
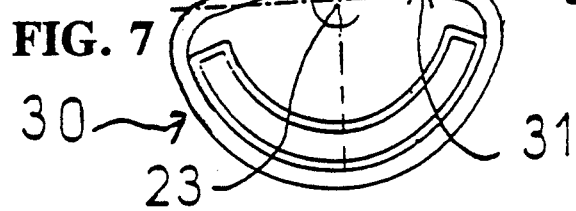
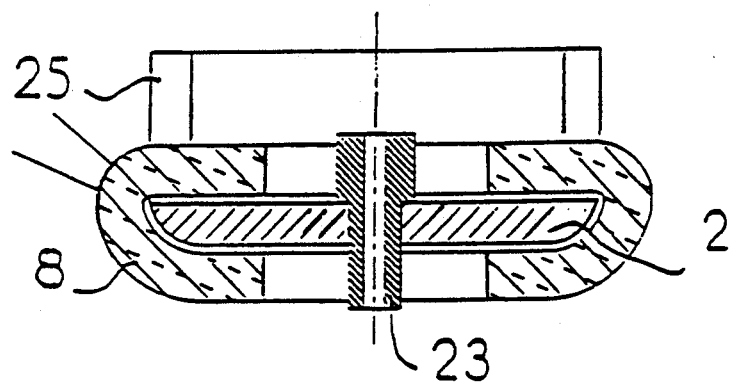
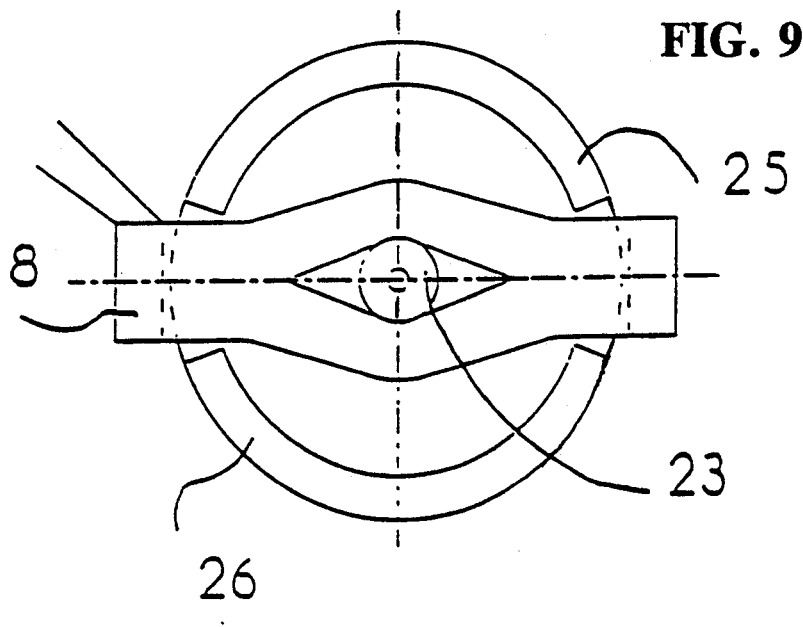

SINGLE PHASE ELECTRO-MAGNETIC ACTUATOR WITH LOW OBSTRUCTION

This invention pertains to a single phase electro-magnetic actuator which is equipped with a rotor that is arranged inside an armature of a statoric structure comprised of an initial magnetic circuit which includes 2N poles and at least one excitation coil, and a second magnetic circuit. The magnetic circuits are executed with a material that has high magnetic permeability. The rotor displays a thin magnetized section which is comprised of 2N pair of thin magnetized poles crosswise in opposite direction. The magnetization is nearly uniform and extends along a length $Y_A$ that is measured according to the displacement path. These types of actuators are designed especially for rotating actuators or even control panel indicators. These actuators display the peculiarity of possessing a large area wherein the force is constant. Hence, it is possible to execute actuators which possess high reproducibility and extremely high angular accuracy through servo-control. These actuators display nevertheless a disadvantage for applications where advanced miniaturization is sought. Indeed, the constant force zone only exists, according to what we learn from the state of the art, when the magnetic circuit is closed. For this to occur, the initial magnetic circuit and the second magnetic circuit are united in all instances by a magnetic part which is placed outside the path traveled by the mobile organ. This magnetic part which unites the magnetic circuits must display a size that is sufficient to enable the passage of magnetic flows and therefore embodies an additional prejudicial cumbersomeness.

The purpose of this invention is to execute a single phase electro-magnetic actuator which displays the same reproducibility and angular accuracy qualities, at reduced overall dimensions.

This invention is characterized by the fact that the two magnetic circuits are connected solely by non magnetic braces, and in that N is less than $$\frac{\pi D}{8E},$$

E being the thickness of the distance armature between the two magnetic circuits and D being the average diameter of the statoric structure. Under those circumstances, the applicant was able to execute, surprisingly and contrary to any lesson derived from the state of the art, an electro-magnetic actuator in which an extended zone exists at a constant force.

According to an initial implementation mode, the actuator includes a tubular rotor which is radially magnetized and that displays 2N pairs of staggered poles, the ratio between the thickness E of the armature and the length Y of said poles being less than 0.25. The statoric structure is comprised of an initial magnetic circuit that surrounds the rotor and displays 2N polar sections which are excited by electrical coils, and by a second magnetic circuit comprised of a full cylinder placed inside the rotor, the rotor and the two magnetic circuits being coaxial, we can execute, by selecting very low height cylinders, extremely flat indicators or actuators with very low obstruction.

According to an advantageous variant, the pairs of magnetic poles of the rotor are attached to the second magnetic circuit. The second magnetic circuit thus comprises a support for the rotor, which is fairly fragile, and can support the utilization axis of the actuator.

According to another implementation mode, the rotor is comprised of a thin disk which is divided into 2N angular sectors that are magnetized crosswise in staggered directions, whereby the rotor can turn around a central axis between an initial magnetic circuit that is comprised of 2N angular sectors surrounded by excitation coils and by a second magnetic circuit comprised of a disk that is coaxial with the rotor and the second magnetic circuit.

Preferably, the thickness of the second magnetic circuit is at least equal to $$0.4 \times \frac{BO}{B_s at} \times \frac{D^2 - d^2}{D_s tat},$$

BO represents the induction of the magnet, $B_s$at represents the saturation induction inside the iron, D represents the outer diameter of the magnetized part of the magnet, d represents the internal diameter of the magnetized part located inside the armature, and $D_s$tat corresponds to the outer diameter of the second magnetic circuit which is larger than D. The second magnetic circuit that is implemented in this fashion allows for optimal passage of magnetic flows. Therefore, the constant force zone is the widest possible.

According to a particular implementation mode the second magnetic circuit is glued onto the rotor. We encompass therefore a second magnetic-rotor unit that is highly rigid and which can be used especially as a control panel indicator.

According to a particular implementation mode of this invention, at least one of the magnetic circuit displays along at least one of its polar crests a chamfer or a tilted edge. When we say tilted edge we mean that, in the case of an implementation wherein the rotor is comprised of a disk, the edge of at least one of the polar parts forms an angle with a sequent radial line that ranges between 0° and 10°, and in the event of a cylindrical type of implementation the edge of at least one of the polar parts forms an angle that ranges between 0° and 10° with a secant generator.

In this particular implementation mode, we master the locking effect of the rotor in the absence of electrical current, when the electric current has brought the rotor into a position wherein one of the edges of the magnetized section cooperates with the chamfer or the tilted edge. Preferably, the chamfer forms with the plane of the rotor an angle that ranges from 30° to 60°. The width of the chamfer is advantageously included between 1/5 and 1/20 of the length of the developed pole.

According to a particular implementation mode, one of the magnetic poles of the statoric structure is surrounded by a servo-control coil that issues a control signal.

This invention will be better understood in the description that follows, or by relying on the drawings where:

FIG. 1 displays a cross sectional view of a rotating actuator according to the present invention.

Figure 2:
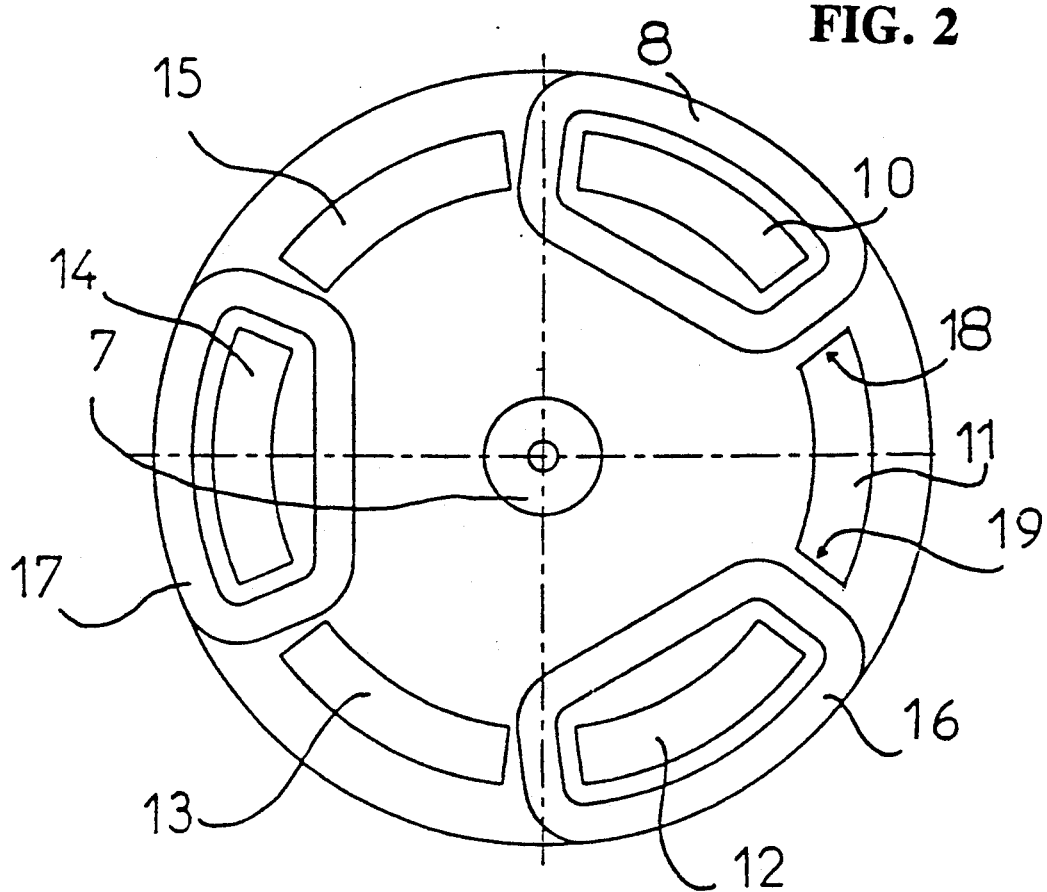
Figure 3:
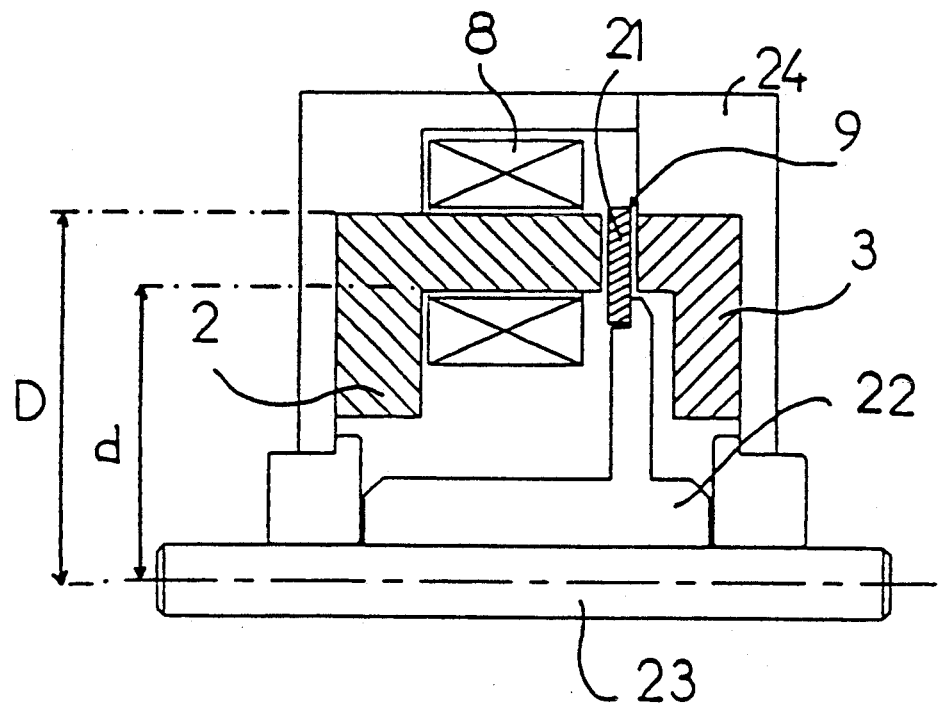
Figure 4:
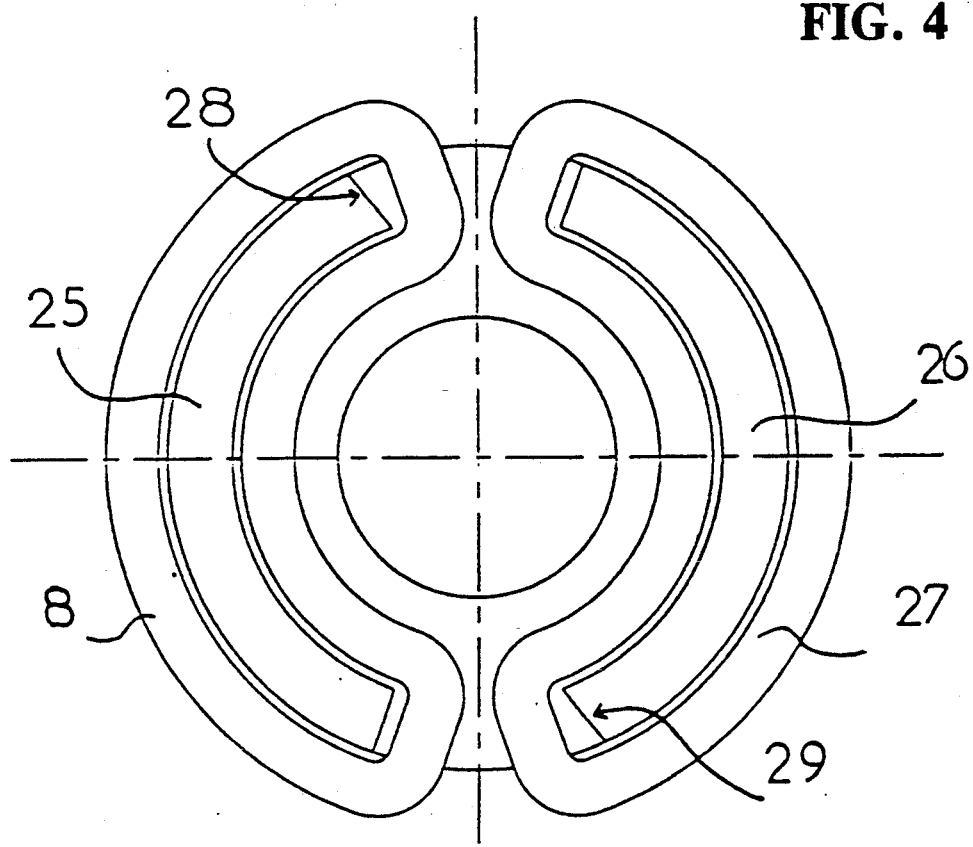

FIG. 2 depicts a median cross sectional view of the initial magnetic circuit of said rotating actuator, FIG. 3 displays a cross sectional view of a second implementation mode, FIG. 4 displays the section of the initial magnetic circuit that corresponds to that second variant, FIGS. 5 to 9 display different variants of coiling for a rotating actuator as displayed in FIG. 4.

The actuator displayed in FIG. 1 includes a cylindrical rotor (1) and a statoric structure comprised of an initial magnetic circuit (2) and a second magnetic circuit (3). The rotor (1) is comprised of a rigid rim (4) on which a thin cylindrical-shaped magnet is affixed (5). This thin magnet displays six polar sections that are magnetized crosswise (across their length), in staggered direction. The rotor (1) is mounted on an axle (6) that is guided by a bearing (7), for instance a ball bearing. The initial magnetic circuit (2) is comprised of a part that is executed in a material with very high magnetic permeability, which is stamped in the shape of a tray. The initial magnetic circuit displays six polar parts. Electrical coils (8) are placed around magnetic poles of the initial magnetic circuit. The second magnetic circuit (3) is comprised of a disk which is executed in a material that has very high magnetic permeability. It defines, together with the initial magnetic circuit (2), an armature (9) in which the magnetized cylinder circulates (5).

FIG. 2 displays a view of the initial magnetic circuit. We can see six magnetic poles (10 to 15), as well as electrical coils (8, 16, 17). The coils (8 and 16) are excitation coils whereas the coil (17) is a servo-control coil that issues an electrical signal to an electronic circuit. The magnetic pole (11) displays two lateral crests that are chamfered (18, 19). As can be seen in FIG. 1, the initial magnetic circuit (2) and the second magnetic circuit (3) are not joined by magnetic parts but rather by non magnetic linkage parts (20).

In the implementation mode illustrated in FIG. 3, the rotor is comprised of a circular magnetized section (21) that is mounted on a rigid non magnetic rim (22) which cooperates with an axle (23). The circular magnetized section (21) is divided into two poles that are magnetized crosswise, in opposite direction. The outer diameter of the magnetized section placed inside the brace (9). The statoric structure is comprised of an initial magnetic circuit (2) and a second magnetic circuit (3). The initial magnetic circuit (2) is comprised of a cylinder that displays according to two opposite generators a notch that enables the passage of the excitation coil (8). The second magnetic circuit (3) is comprised of a full cylinder which displays, according to two generators, symmetrically in relation to the notches for the passage of the coil (8), tooling that avoids the imbalance of the forces being exerted on the magnetized section (21). The two magnetic circuits (2, 3) are joined only by the casing (24) that is made of non magnetic material.

FIG. 4 displays a median cross sectional view of the initial magnetic circuit. We can see an initial polar section (25) comprised of an angular sector of a cylinder and a second symmetrical polar section (26). The coiling (8) is arranged around the initial polar section (25). A second coiling (22) which is symmetrical to the initial coiling (8), produces on the polar (26) a polarity that is opposite to that of the initial pole (25). Each one of the polar sections (25, 26) displays a lateral edge which is respectively tilted (28, 29). Those tilted edges make it possible to adjust the locking force of the rotor when the junction between the two polar sections of the magnetized section (21) occurs in the zone wherein a release force reigns.

In the coiling mode displayed in FIG. 5, the coils (8, 27) are arranged in the crosswise plane, around magnetic circuits respectively (25, 26). The coiling displays an active section (30) that extends according to an arc of a circle that follows very closely the magnetic circuit (25). The linkage takes place along a linear segment (31) which links the two ends of the active section (30). That coiling segment such as (31) goes on each side the axle (23). If the magnetic circuits (25, 26) are extended along a more significant angular sector, or that the diameter of the axle (23) prevents the implementation mode displayed in FIG. 5, the coiling can be carried out as depicted in FIG. 6 or in FIG. 7. In FIG. 6, the two ends of the active section (31) which forms roughly an arc of a circle that goes around the axle (23) from the outside. In the implementation mode displayed in FIG. 7, the linkage section (31) goes around the axle (23) from the outside.

According to another implementation mode displayed in FIG. (8), the coiling takes place not in the median plane of the magnetic circuits but in the crosswise plane. The coiling (8) goes through the notches that separate the two poles (25, 26) of the magnetic circuit (2) and goes alternatively through the axle (23) as depicted in FIG. 9. It is understood that those coiling examples are provided as examples and do not constitute in any way the exhaustive compendium of conceivable solutions.

This invention is not at all restricted to the implementation mode that precedes and it extends on the contrary to all variants.

We claim:

1. A single phase electro-magnetic actuator enclosed in a stator structure and including a rotor arranged inside a brace of said stator structure, said actuator including an initial magnetic circuit which includes 2N poles and at least one excitation coil, and a second magnetic circuit, said magnetic circuits being executed in a material with high magnetic permeability, the rotor displaying a thin magnetized section comprised of 2N pairs of poles which are magnetized across their respective lengths, in staggered direction, the magnetization being substantially uniform and extending along a path $Y_A$ that is measured along the travel path, wherein said initial magnetic circuit is connected to the second magnetic circuit only by non magnetic linkage parts and wherein N is an integer value less than $\pi D/8E$, E being the distance measured between said two magnetic circuits and D being the average diameter of said stator structure.

2. A single phase electro-magnetic actuator according to claim 1, characterized in that it includes a tubular rotor that is radially magnetized, and displaying 2N pairs of staggered poles, the ratio between the thickness E of the brace of said poles and the length Y of said poles measured on the circumference of the rotor being less than 0.25, and in that the statoric structure is comprised of said initial magnetic circuit surrounding the rotor and displaying 2N polar parts excited by said electrical coils and said second magnetic circuit comprised of a full cylinder arranged inside the rotor, the rotor and the two magnetic circuits being coaxial.

3. A single phase electro-magnetic actuator according to claim 2, characterized in that the pairs of magnetic poles of the rotor are attached to the second magnetic circuit.

4. A single phased electro-magnetic actuator according to claim 1, characterized in that the rotor is comprised of a thin disk divided into 2N angular sectors that are magnetized crosswise in staggered directions, said rotor being mobile between said initial magnetic circuit (2) comprised of 2N angular sectors surrounded, for at least some of them, by said excitation coils and said second magnetic circuit which is coaxial with the rotor.

5. A single phase electro-magnetic actuator according to claim 4, characterized in that the thickness of the second magnetic circuit is at least equal to $$\frac{BO}{B_sat} \times \frac{D^2 - d^2}{D_sat} \times 0.4$$

where BO represents the induction of the magnet, $B_sat$ represents the saturation induction inside the iron, D represents the outer diameter of the magnetized section of the magnet, d represents the internal diameter of the magnetized section located inside the armature, and $D_sat$ corresponds to the outer diameter of the second magnetic circuit which can be greater than D.

6. A single phase electro-magnetic actuator according to any one of claims 4 or 5, characterized in that the second magnetic circuit is attached to the rotor.

7. A single phase electro-magnetic actuator according to claim 1, characterized in that at least one of the magnetic circuits displays along at least one of its polar crests a chamfer or a tilted edge.

8. A single phase electro-magnetic actuator according to claim 7, characterized in that each of the sectors of the initial magnetic circuit displays at least one radial crest which presents a chamfer that forms an angle with the plane of the rotor ranging between 30° and 60°.

9. A single phase electro-magnetic actuator according to claims 7 or 8, characterized in that the width of the chamfer is included between 1/5 and 1/20 of the length of the developed pole.

10. A single phase electro-magnetic actuator according to claim 1, characterized in that N is greater than 1, one of the two magnetic circuits includes at least also one servo-control coil, that is not traveled by the current and is not influenced by the flow deriving from the current of the other coils.

11. A single phase electro-magnetic actuator according to claim 1, characterized in that one of the magnetic elements includes a servo-control coil.

* * * * *